(12) United States Patent
Sylvain

(10) Patent No.: US 7,096,043 B1
(45) Date of Patent: Aug. 22, 2006

(54) CALL ORIGINATION CONTROL

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 234 days.

(21) Appl. No.: 10/693,806

(22) Filed: Oct. 24, 2003

(51) Int. Cl.
*H04B 1/38* (2006.01)

(52) U.S. Cl. ............... 455/565; 455/408; 455/410; 379/112.01; 379/114.01

(58) Field of Classification Search ........ 455/411, 455/419, 565, 408, 410; 379/201.02, 201.01, 379/112.01, 114.01
See application file for complete search history.

(56) References Cited

U.S. PATENT DOCUMENTS

| | | | |
|---|---|---|---|
| 6,031,904 A | 2/2000 | An et al. | 379/201 |
| 6,185,565 B1 | 2/2001 | Meubus et al. | 707/10 |
| 6,226,364 B1 * | 5/2001 | O'Neil | 379/114.2 |
| 6,275,577 B1 * | 8/2001 | Jackson | 379/211.01 |
| 6,622,016 B1 * | 9/2003 | Sladek et al. | 455/414.1 |
| 2002/0137490 A1 * | 9/2002 | Gallant | 455/411 |

* cited by examiner

*Primary Examiner*—Danh Cong Le
(74) *Attorney, Agent, or Firm*—Withrow & Terranova, PLLC

(57) ABSTRACT

The present invention provides for selectively blocking outgoing calls based on blocking criteria configured by a telephony subscriber or representative thereof. When a call is initiated, blocking criteria associated with the telephony terminal from which the call is being initiated are used to determine whether the call should be blocked or allowed to continue. Once a determination is made, a telephony switch or telephony server supporting the telephony terminal either blocks the call or allows the call to continue as dictated by the blocking criteria. The blocking criteria may be applied to one or more telephony terminals. Further, the blocking criteria may be based on the party being called, time of day, day of week, financial authorization, type of call, or any combination thereof. The subscribers or representatives thereof can easily and efficiently configure the blocking criteria to control whether or not outgoing calls are blocked or allowed to continue.

38 Claims, 4 Drawing Sheets

CALL ORIGINATION CONTROL

FIELD OF THE INVENTION

The present invention relates to controlling call origination, and in particular to providing and implementing rules to selectively block or allow outgoing calls from one or more telephony devices.

BACKGROUND OF THE INVENTION

There are numerous reasons to limit or otherwise block the origination of outgoing calls. Parents may want to limit their children's ability to call certain people, or make certain types of calls. Further, parents may want to limit the times at which calls can be made. Office administrators or business owners often desire to impose similar limitations on employees.

Unfortunately, there are very few ways to limit outgoing calls. Typically, a telephony switch servicing a telephony terminal must be provisioned to block certain types of calls from that telephony terminal. Such provisioning is generally limited to blocking broad categories of calls, such as 900, long distance, or international calls. In addition to being limited to blocking certain categories of calls, such provisioning requires subscribers or their representatives to request that the service providers provision the telephony switch in the desired fashion. Accordingly, current techniques for blocking certain types of outgoing calls are not only inflexible, but also cumbersome. There is a need for an efficient and flexible way for subscribers or their representatives to block outgoing calls as they desire, as well as a telephony system in which such blocking of calls can be efficiently implemented.

SUMMARY OF THE INVENTION

The present invention provides for selectively blocking outgoing calls based on blocking criteria configured by a telephony subscriber or representative thereof. When a call is initiated, blocking criteria associated with the telephony terminal from which the call is being initiated are used to determine whether the call should be blocked or allowed to continue. Once a determination is made, a telephony switch or telephony server supporting the telephony terminal either blocks the call or allows the call to continue as dictated by the blocking criteria. The blocking criteria may be applied to one telephony terminal or a group of telephony terminals. Further, the blocking criteria may be based on the party being called, time of day, day of the week, financial authorization, type of call, or any combination thereof. The subscribers or representatives thereof can easily and efficiently configure the blocking criteria to control whether or not outgoing calls are allowed to continue.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
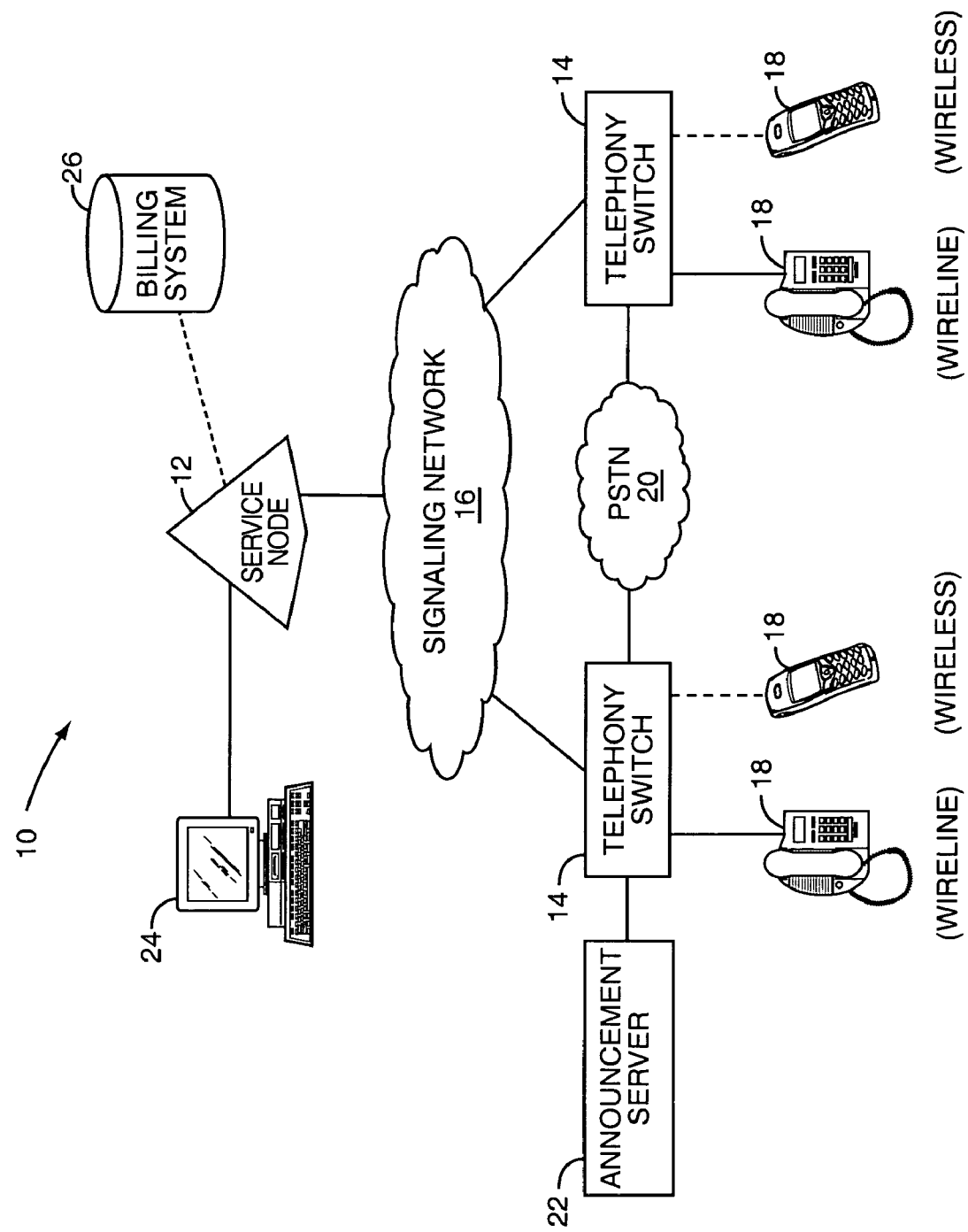
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a telephony switch or like telephony server to selectively block calls being originated from a telephony terminal based on blocking criteria established by a subscriber or representative thereof. The blocking criteria include one or more rules that define when to block call origination or allow a call to continue. The blocking criteria can be readily configured by a subscriber or representative thereof, and may be used by the telephony switch or like telephony server to block or allow call origination. For example, the blocking criteria may be configured by the subscriber or representative thereof via a web interface, telephony interface, or other interface facilitating human interaction. The blocking criteria may be individually configured for a single telephony terminal, or for a group of telephony terminals supported by the same or different telephony switches or telephony servers.

The rules for the blocking criteria may be configured to block call originations from one or more telephony terminals based on the party being called, time of day, date, call type, such as 900 calls, long distance calls, or international calls, or the financial ability to incur charges from the telephony terminal. For example, blocking criteria may be established to block calls to specific telephony addresses, such as directory numbers or uniform resources locators. Alternatively, the blocking criteria may be configured to block all outgoing calls, except those directed to identified called parties. Yet another call blocking criteria may use wildcard numbers of characters in a telephony address to control call blocking. For example, all calls to a certain area code or local exchange may be blocked based on the use of wildcards. Alternatively, only those calls within a certain area code or exchange may be allowed to continue. The blocking criteria may be based on one or a combination of the above factors. Further, certain rules within the blocking criteria may be established for a defined period of time, after which the rule will expire. A parent may establish blocking criteria, which will effectively last a set period of time in which calls to any one of a number of identified parties are blocked during homework hours.

The present invention is applicable to wireline and wireless environments, which are circuit-switched or packet-based. For cellular applications, the blocking criteria may be arranged wherein calls to certain directory numbers are always allowed, yet calls to other directory numbers are governed by one or more accounting rules. For example, a parent may establish a set of rules wherein her child may always call the parent, but only so many minutes of airtime are otherwise available to the child on any given day, week, or month. In one embodiment, billing information may be accessed to control the blocking of calls being originated from a telephone terminal. In prepaid embodiments, call origination is allowed only if the prepaid balance is not exceeded, or if a defined credit limit has not been exceeded. A further enhancement would be to allow only select calls to be made to certain parties or at certain times if these limits are exceeded. Other rules may apply when the limits are not exceeded.

As noted, the blocking criteria may be applied to multiple telephony terminals forming a group. These groups may represent a family group, a business group, or any other desired grouping of telephony terminals. Further, the telephony terminals within the group need not be serviced from the same telephony switch or telephony server, and may be of different types. For example, the group of telephony terminals may include any combination of wireline and wireless telephony terminals, which may be based on circuit-switched or packet-based technologies.

With reference to FIG. 1, an exemplary communication environment 10 is illustrated according to one embodiment of the present invention. To facilitate the establishment of blocking criteria and the implementation thereof, a service node 12 is provided. The service node 12 will interact with one or more telephony switches 14 via a signaling network 16. The telephony switches 14 may be wireline or wireless switches, which support one or more telephony terminals 18 and allow calls to be established over the Public Switched Telephony Network (PSTN) 20. Additionally, an announcement server 22 may be associated with one or more of the telephony switches 14 and configured to provide audible announcements to a telephony terminal 18. The audible announcements may provide information to the subscriber or representative thereof indicating a call origination attempt is being blocked, or why the origination attempt is being blocked. The telephony switch 14 will interact with the service node 12 when a call is being originated to determine whether to block the call or allow the call to continue to completion. When the call is to be blocked, the telephony switch 14 can access an appropriate announcement from the announcement server 22 and provide that announcement to the subscriber or representative thereof via the telephony terminal 18.

In operation, once the telephony switch 14 detects a call origination attempt, the telephony switch 14 is provisioned to send a message to the service node 12 to identify the call origination attempt. The service node 12 will identify the telephony terminal 18 from which the call origination attempt is being made based on information in the message or otherwise provided by the telephony switch 14, and based on the blocking criteria for that telephony terminal 18, determine whether the call origination attempt should be blocked or the call should be allowed to continue to completion. The service node 12 will send appropriate instructions to the telephony switch 14, which will take the necessary action to either block the call origination attempt or continue with the call. The service node 12 may provide further instructions identifying an appropriate announcement for the announcement server 22 to provide to the subscriber or representative thereof via the telephony switch 14. Again, the blocking criteria may be unique to a particular telephony terminal 18, or may be provided for a group thereof.

The subscriber or representative thereof may log into the service node 12 directly or indirectly, preferably via a web interface over the internet from an appropriate client 24, which may be a personal computer, personal digital assistant, or like computing device, capable of allowing the subscriber or representative thereof to define the blocking criteria for one or more telephony terminals 18. The subscriber or representative thereof may also interact with the service node 12 through other means, such as an interactive voice response system (not shown) provided in association with the telephony switch 14 or PSTN 20. Those skilled in the art will recognize numerous techniques to allow the subscriber or representative thereof to interact with the service node 12. Further, the service node functionality may be implemented in the telephony switch 14.

When the blocking criteria require financial or other accounting information, the service node 12 may access a billing system 26 to access financial information, which may dictate whether or not a call should be blocked. The financial information may bear on prepaid balances or available credit to which telephony charges may be accrued.

Figure 2A:
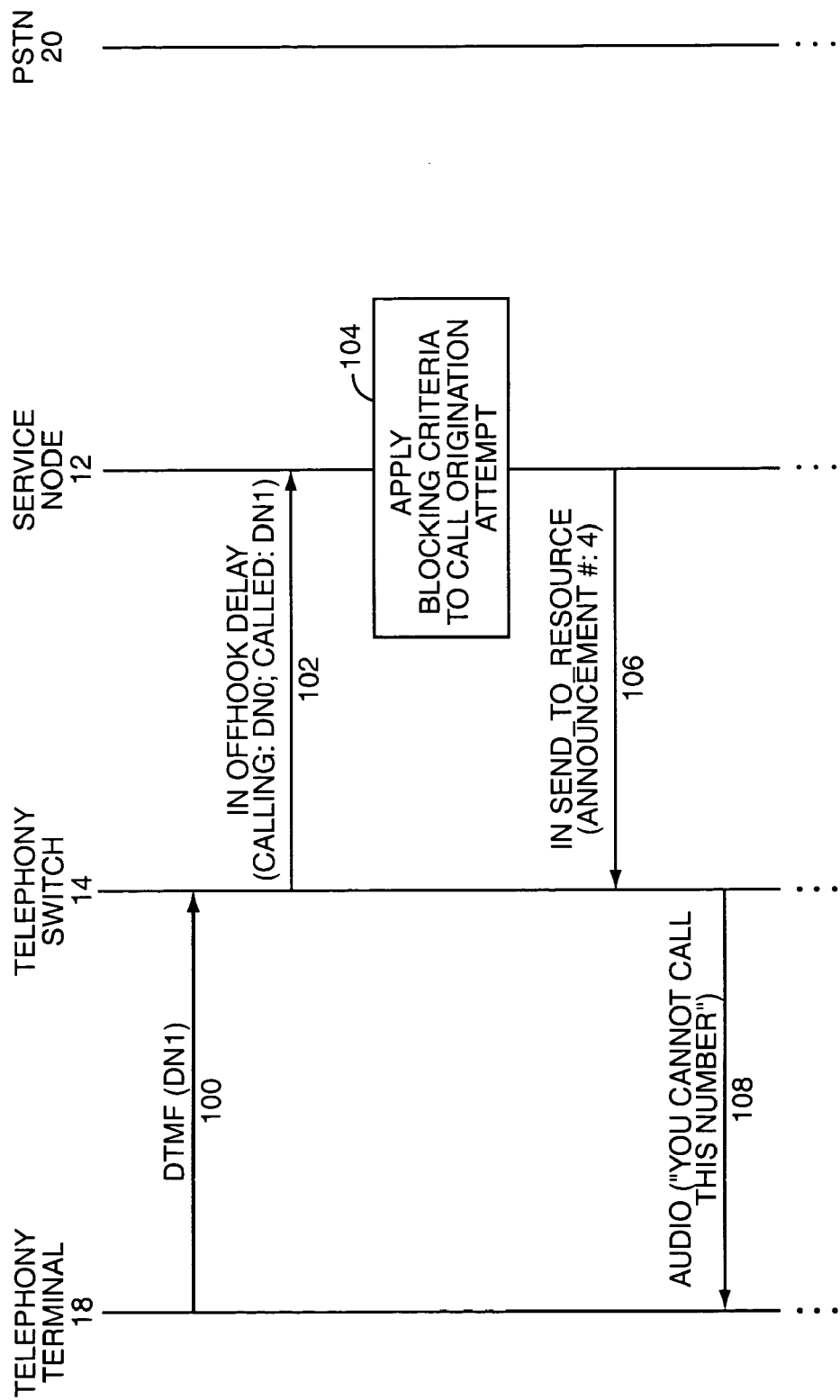
FIG. 2A is a communication call flow diagram wherein an outgoing call is blocked, according to one embodiment of the present invention.
Figure 2B:
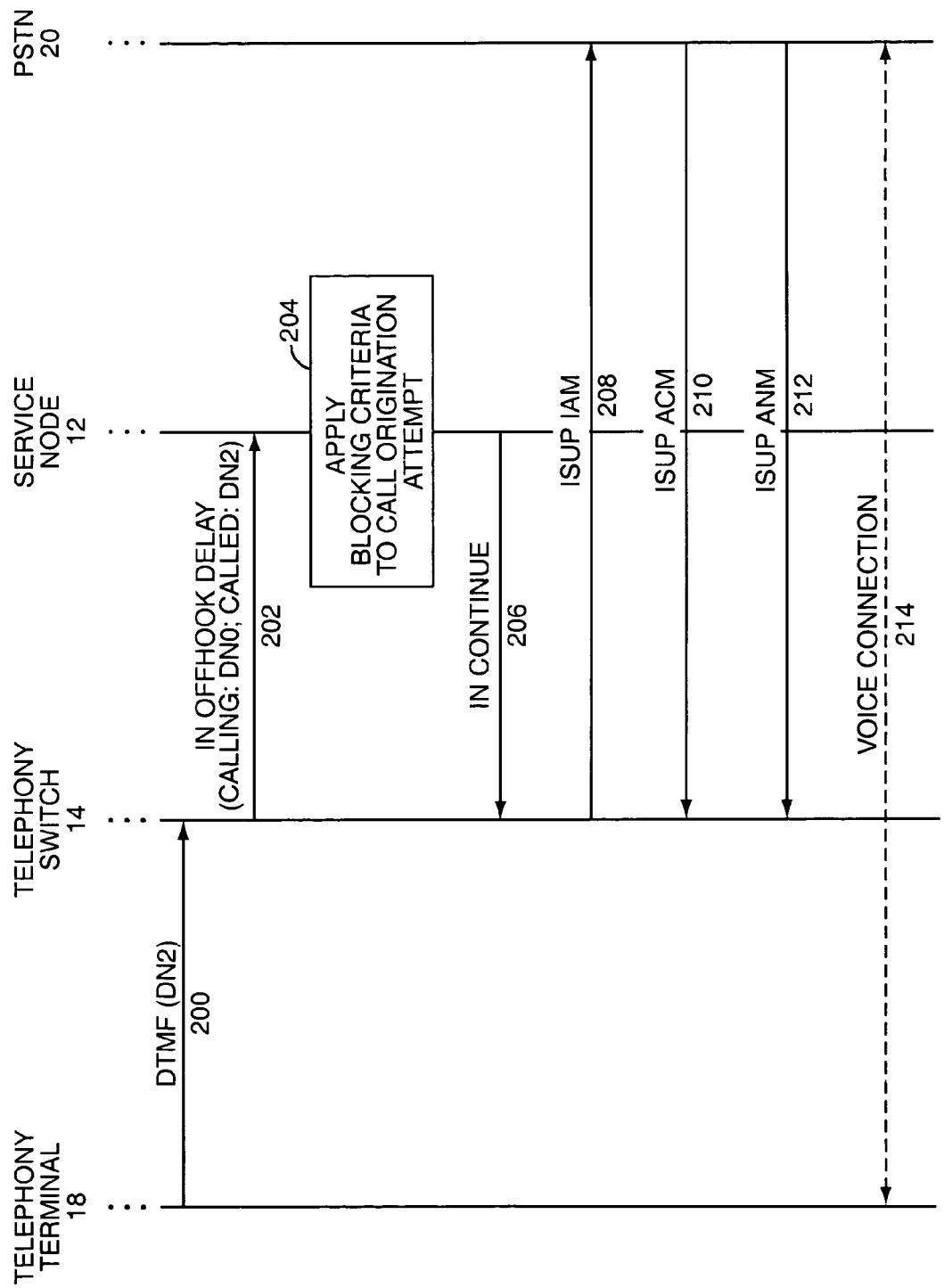
FIG. 2B is a communication call flow diagram wherein an outgoing call is allowed to be completed, according to one embodiment of the present invention.

With reference to FIGS. 2A and 2B, exemplary communication flows are illustrated for blocking a call origination attempt, as well as allowing a call to continue, respectively. With particular reference to FIG. 2A, a call is originated from a telephony terminal 18 associated with directory number DN0, when dual tone multi-frequency (DTMF) digits are dialed, and subsequently received by the telephony switch 14 (step 100). The dialed digits correspond to a telephony terminal associated with directory number DN1. The telephony switch 14 will recognize that a call origination attempt is being made, and that a call blocking function for that telephony terminal 18 has been established. Accordingly, the telephony switch 14 will send a message to the service node 12 indicating that the telephony terminal 18 is attempting to call a telephony terminal associated with directory number DN1 (step 102). The message sent to the service node 12 in one embodiment is an Intelligent Network (IN) environment may be an IN Offhook Delay message identifying the calling and called parties by their respective directory numbers DN0 and DN1. In other embodiments, the message may be based on SIP (Session Initiation Protocol), H.323 or similar protocols. The service node 12 will receive the message from the telephony switch 14, identify the blocking criteria associated with the telephony terminal 18, and apply the blocking criteria to the call origination attempt to determine whether to block the call origination attempt or allow the call to continue (step 104).

In this case, assume that the call origination attempt is to be blocked, and as such, the service node 12 will send an appropriate message to the telephony switch 14 to instruct the telephony switch 14 to block the call origination attempt (step 106). The message sent to the telephony switch 14 may be an IN Send To Resource message. In this embodiment, the service node 12 also identifies an announcement (Announcement #4) to provide to the caller to indicate that the call origination attempt is to be blocked. Accordingly, the telephony switch 14 will access the appropriate message at the announcement server 22 and provide a connection to the announcement server 22 such that a message such as, "You cannot call this number," is provided in an audible format to the caller via the telephony terminal 18 (step 108). Those skilled in the art will recognize that an announcement does not have to be provided in association with blocking a call origination attempt. Further, the announcements that are provided to the caller may vary in scope and the amount of information provided.

With reference to FIG. 2B, a communication flow is illustrated wherein the call is allowed to continue to completion. Initially, DTMF digits for a telephony terminal associated with directory number DN2 are received at the telephony switch 14 (step 200). An IN Offhook Delay message identifying the calling and called parties by their respective directory numbers DN0 and DN2 is sent to the service node 12 (step 202). The service node 12 will provide the appropriate blocking criteria to the call origination attempt (step 204), and determine that the call should be allowed to continue. The service node 12 will then send an IN Continue message to the telephony switch 14 to effectively instruct the telephony switch 14 to continue with processing the call in normal fashion (step 206). As such, an Integrated Services User Part (ISUP) Initial Address Message (IAM) is sent through the PSTN 20 to the appropriate telephony switch supporting the telephony terminal associated with directory number DN2 (step 208). The telephony switch 14 will receive an ISUP Address Complete Message (ACM) from the remote telephony switch (step 210), and when the called party answers, the telephony switch 14 will receive an ISUP Answer Message (ANM) (step 212). At this point, a voice connection is established between the telephony terminal 18 and the called party's telephony terminal through the telephony switch 14 and the PSTN 20, in traditional fashion (step 214).

Figure 3:
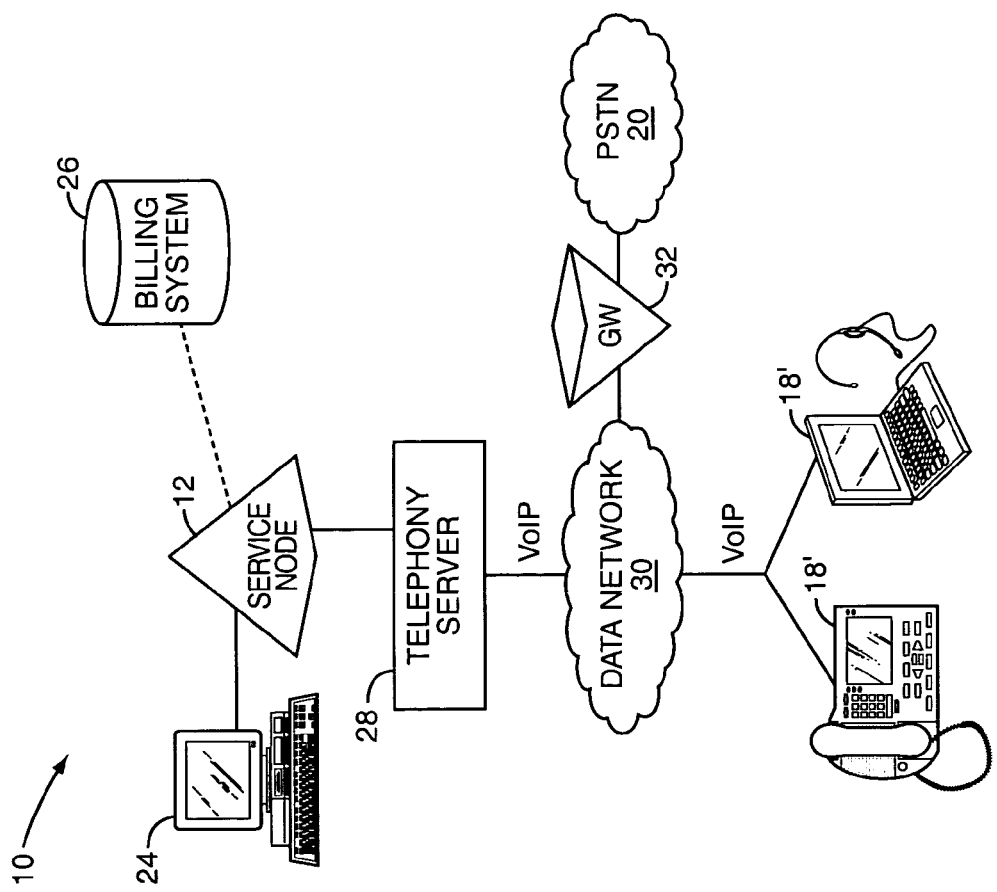
FIG. 3 is a block representation of an alternative communication embodiment according to the present invention.

Although the above embodiments focus on a circuit-switched environment, the present invention is equally applicable to packet-based environments, such as that illustrated in FIG. 3. In essence, the telephony switch 14 is replaced with a telephony server 28, which effectively controls packet-based communications over a data network 30 between packet-based telephony terminals 18' and a gateway 32, which provides an interface to the PSTN 20. Notably, the packet-based telephony terminals 18' may take numerous forms, including self-contained telephony type terminals, as well as telephony clients implemented in personal computing devices. In operation, the telephony server 28 will cooperate with the packet-based telephony terminals 18' and the gateway 32 to establish packet sessions therebetween to aid in facilitating calls. When a packet telephony terminal 18' attempts to originate a call, the telephony server 28 will recognize the call initiation attempt and interact with the service node 12 to determine whether the call should be blocked or allowed to continue. If a call is to be blocked, such action is taken. Otherwise, the telephony server 28 will take the necessary steps to establish the call over the data network 30, and perhaps over the PSTN 20 via the gateway 32. Those skilled in the art will recognize how calls are established in a packet domain, as well as how those calls extend into the PSTN 20. Importantly, the concepts of the present invention are applicable to circuit-switched and packet-based environments. Those skilled in the art will also recognize that the service node functionality may be incorporated in the telephony server 28.

Figure 4:
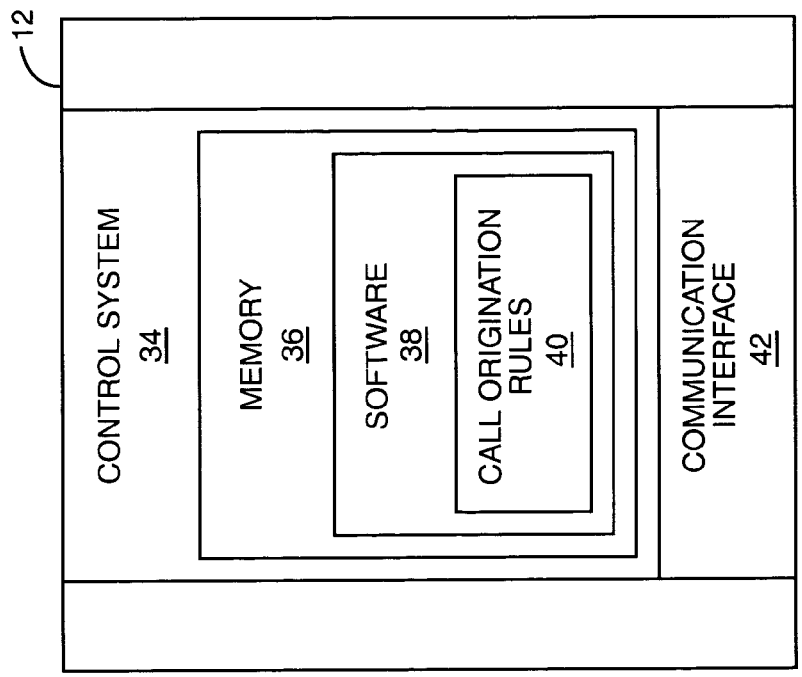
FIG. 4 is a block representation of a service node according to one embodiment of the present invention.

With reference to FIG. 4, a block diagram of the service node 12 is provided according to one embodiment of the present invention. In general, the service node 12 will include a control system 34 having sufficient memory 36 for the software 38 used to implement the above functionality. The software 38 will typically include call origination rules 40, which are used to implement the blocking criteria that are configured by the subscriber or representative thereof, and used to control the telephony switch 14 or telephony server 28 during call origination attempts. The control system 34 is also associated with one or more communication interfaces 42, which allow communications with the telephony switch 14 or telephony server 28, as well as interface devices through which the subscriber or representative thereof can configure the blocking criteria.

Those skilled in the art will recognize improvements and modifications to the preferred embodiments of the present invention. All such improvements and modifications are considered within the scope of the concepts disclosed herein and the claims that follow.

What is claimed is:

1. A method for selectively blocking outgoing calls comprising:

receiving blocking indicia from a subscriber or representative thereof who is associated with a telephony terminal;

establishing blocking criteria based on the blocking indicia;

receiving a first message indicative of a call being initiated from the telephony terminal; and determining whether to block the call or allow the call to continue based on the blocking criteria, wherein the blocking criteria are configured to block calls based on financial authorization and further comprising accessing and using financial records to help determine whether to block the call or allow the call to continue.

2. The method of claim 1 further comprising sending a second message with instructions to either block the call or allow the call to continue based on the blocking criteria.

3. The method of claim 2 wherein the second message is sent to a telephony switch supporting the telephony terminal and the first message is received from the telephony switch.

4. The method of claim 2 wherein the second message is sent to a telephony server supporting the telephony terminal and the first message is received from the telephony server.

5. The method of claim 1 wherein the blocking indicia is received via one of a group consisting of a web interface and a voice interface.

6. The method of claim 1 wherein the blocking criteria is associated with a plurality of telephony terminals including the telephony terminal.

7. The method of claim 6 wherein at least two of the plurality of telephony terminals are from different types of telephony terminals consisting of circuit-switched wireless, circuit-switched wireline, packet-based wireline, and packet-based wireless.

8. The method of claim 1 wherein the blocking criteria are configured to block calls to at least one specified called party.

9. The method of claim 8 wherein the specified called party is identified in the blocking criteria by a telephony address.

10. The method of claim 1 wherein the blocking criteria are configured to block calls based on time or date.

11. The method of claim 1 wherein the blocking criteria expire after a defined period of time.

12. The method of claim 1 wherein the blocking criteria are based on whether a pre-paid balance has been exceeded.

13. The method of claim 1 wherein the blocking criteria are based on a subscribed amount of time being exceeded.

14. The method of claim 1 wherein the blocking criteria are configured to allow calls to at least one called party when financial authorization is not provided.

15. The method of claim 1 wherein the blocking criteria are configured to block calls that are not directed to at least one identified called party.

16. The method of claim 1 wherein the blocking criteria are configured to block calls to telephony addresses meeting defined wildcard criteria.

17. The method of claim 1 wherein the blocking criteria are configured to block calls that are at least one type of call.

18. The method of claim 1 wherein the blocking criteria are configured to require a plurality of conditions to be met prior to blocking the call.

19. The method of claim 1 further comprising sending instructions to provide an audible message to a caller at the telephony terminal when the call is blocked.

20. A system for selectively blocking outgoing calls comprising:
   at least one communication interface; and
   a control system associated with the at least one communication interface and adapted to:
      receive blocking indicia from a subscriber or representative thereof who is associated with a telephony terminal;
      establish blocking criteria based on the blocking indicia;
      receive a first message indicative of a call being initiated from the telephony terminal; and
      determine whether to block the call or allow the call to continue based on the blocking criteria, wherein the blocking criteria are configured to block calls based on financial authorization and further comprising accessing and using financial records to help determine whether to block the call or allow the call to continue.

21. The system of claim 20 wherein the control system is further adapted to send a second message with instructions to either block the call or allow the call to continue based on the blocking criteria.

22. The system of claim 21 wherein the second message is sent to a telephony switch supporting the telephony terminal and the first message is received from the telephony switch.

23. The system of claim 21 wherein the second message is sent to a telephony server supporting the telephony terminal and the first message is received from the telephony server.

24. The system of claim 20 wherein the blocking indicia are received via one of a group consisting of a web interface and a voice interface.

25. The system of claim 20 wherein the blocking criteria are associated with a plurality of telephony terminals including the telephony terminal.

26. The system of claim 25 wherein at least two of the plurality of telephony terminals are from different types of telephony terminals consisting of circuit-switched wireless, circuit-switched wireline, packet-based wireline, and packet-based wireless.

27. The system of claim 20 wherein the blocking criteria are configured to block calls to at least one specified called party.

28. The system of claim 27 wherein the specified called party is identified in the blocking criteria by a telephony address.

29. The system of claim 20 wherein the blocking criteria are configured to block calls based on time or date.

30. The system of claim 20 wherein the blocking criteria expire after a defined period of time.

31. The system of claim 20 wherein the blocking criteria are based on whether a pre-paid balance has been exceeded.

32. The system of claim 20 wherein the blocking criteria are based on a subscribed amount of time being exceeded.

33. The system of claim 20 wherein the blocking criteria are configured to allow calls to at least one called party when financial authorization is not provided.

34. The system of claim 20 wherein the blocking criteria are configured to block calls that are not directed to at least one identified called party.

35. The system of claim 20 wherein the blocking criteria are configured to block calls to telephony addresses meeting defined wildcard criteria.

36. The system of claim 20 wherein the blocking criteria are configured to block calls that are at least one type of call.

37. The system of claim 20 wherein the blocking criteria are configured to require a plurality of conditions to be met prior to blocking the call.

38. The system of claim 20 wherein the control system is further adapted to send instructions to provide an audible message to a caller at the telephony terminal when the call is blocked.

* * * * *